Aug. 6, 1957 A. POLSON 2,801,962
METHOD AND APPARATUS FOR ELECTRO-DECANTATION AND
ITS APPLICATION FOR THE SEPARATION OF MATERIALS
Filed July 19, 1952 2 Sheets-Sheet 1
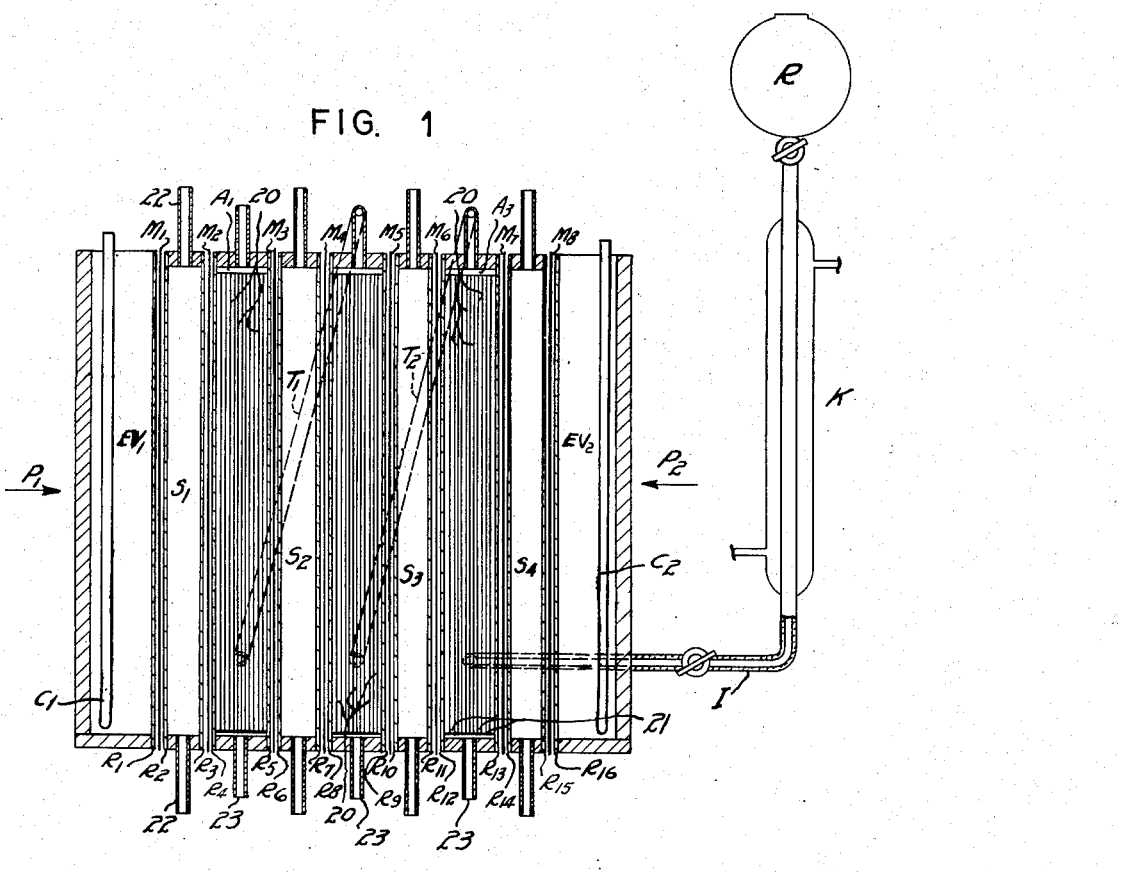
FIG. 1
FIG. 2
ALFRED POLSON
INVENTOR.
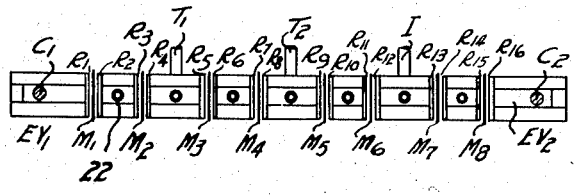
ATTORNEYS

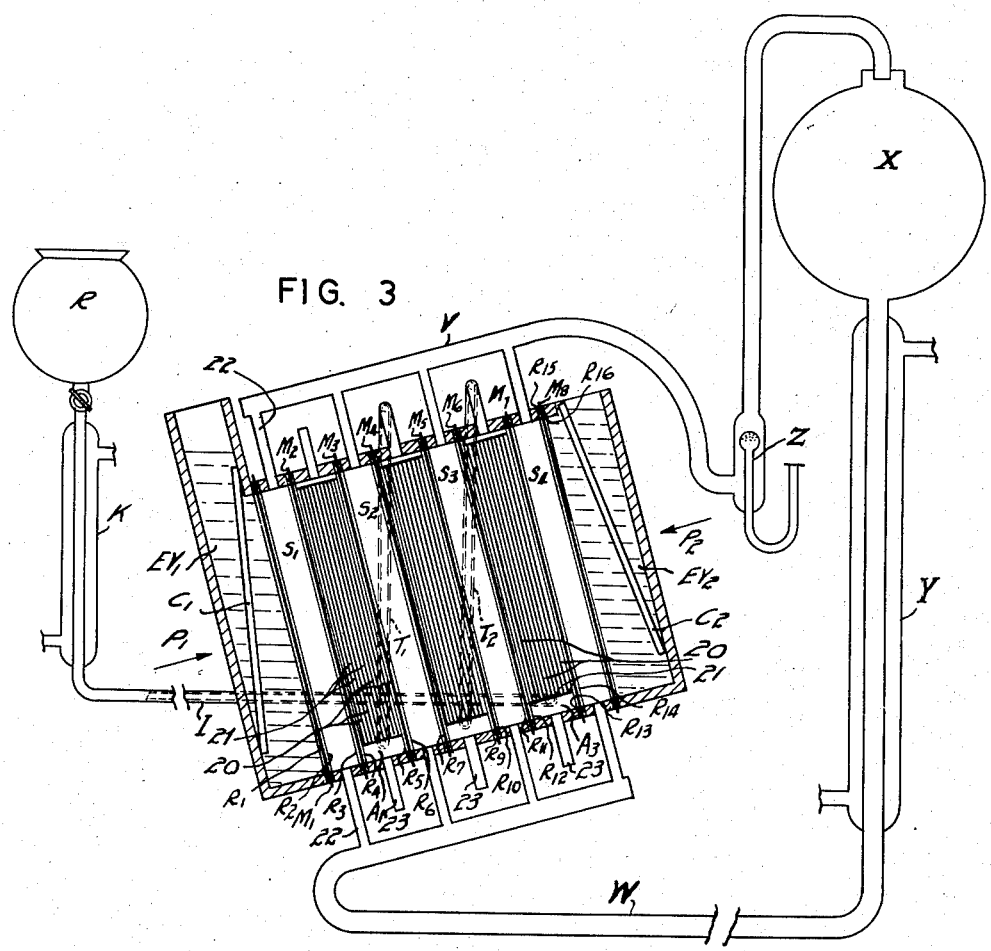

United States Patent Office 2,801,962
Patented Aug. 6, 1957

2,801,962

METHOD AND APPARATUS FOR ELECTRO-DECANTATION AND ITS APPLICATION FOR THE SEPARATION OF MATERIALS

Alfred Polson, Milnerton, Cape, Union of South Africa

Application July 19, 1952, Serial No. 299,899

Claims priority, application Union of South Africa September 3, 1951

6 Claims. (Cl. 204—180)

The present invention relates to an improved method and apparatus for electric decantation and its application for the separation of materials.

An important object of the invention is the purification and/or separation and/or concentration of proteins. The expression separation when hereinafter employed is intended to include, inter alia, purification and concentration in its scope.

Other objects of the invention will become apparent from the following specification.

This invention consists in electro-decantation apparatus which comprises a plurality of compartments some of which are substantially filled with semi-permeable membrane strips, alternating with others adapted to contain a buffer liquid, and means for feeding the protein mixture to the lower part of each membrane containing compartments to allow the mixture to flow upwardly through each of the membrane containing compartments in turn.

The invention also consists in a process for the electro-decantation of protein mixtures which comprises feeding the protein mixture to an electro-decantation apparatus having a plurality of compartments some of which are substantially filled with semi-permeable membrane strips alternating with others adapted to contain a buffer liquid, the said mixture being fed to the lower part of each of the membrane containing compartments in a series fashion.

A practical embodiment of a continuous separation type apparatus in accordance with the invention and operations therewith will be further described and ascertained by way of example with reference ot the accompanying diagrammatic drawings, but is should be understood that the invention is not limited to the examples given.

In the said drawings:

Fig. 1 is a vertical longitudinal section through a continuous separation multi-membrane cell;

Fig. 2 is a top plan view of the cell referred to in Fig. 1; and

Fig. 3 is a vertical longitudinal section through a preferred form of a continuous separation multi-membrane cell.

Referring to Figs. 1 and 2 of the drawings the continuous separation multi-membrane cell is built up of the following sections and compartments: electrode compartments $EV_1$, $EV_2$, buffer compartments $S_1$, $S_2$, $S_3$, $S_4$, and separation compartments $A_1$, $A_2$, $A_3$. These sections are separated from each other by semi-permeable membranes $M_1$, $M_2$, $M_3$, $M_4$, $M_5$, $M_6$, $M_7$, $M_8$, which are held in position by means of rubber gaskets giving a water-tight connection $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$. The whole apparatus is held by means of a clamp or vise (the action of which is indicated by arrows $P_1$ and $P_2$, the clamp not being shown). Compartments $EV_1$ and $EV_2$ contain the carbon electrodes $C_1$ and $C_2$ and are filled with buffer solution. Pre-cooled buffer solution is circulated through buffer compartments $S_1$, $S_2$, $S_3$ and $S_4$ through circulation pipes 22, 23 (numbered only for compartment $S_1$). The separation compartments $A_1$, $A_2$ and $A_3$ contain the semi-permeable membrane strips 20. These membrane strips 20 are separated from each other by plastic frames 21 of 1 mm. thickness. The separation compartments are connected through tubes $T_1$ and $T_2$.

I is the inlet tube for the crude mixture of protein from which a particular fraction is to be separated. The reason for the inlets being positioned a few centimeters above the bottoms of the separation compartments $A_1$, $A_2$ and $A_3$, is to prevent the introduced fluid being mixed with the separated protein collected at the bottoms of said compartments.

The protein introduced into the system from a reservoir R is pre-cooled by running it through a cooler K through which iced water is circulated.

A different way of cooling the introduced material is to pass it through a thin section held between two other sections through which chilled buffer is circulated. This is not shown in the drawing.

OPERATION

The apparatus is assembled as shown in Figs. 1 and 2 of the drawings and held in a vise or clamp. The carbon electrodes $C_1$ and $C_2$ are connected to the poles of a variable direct current supply and the electrode vessels $EV_1$ nad $EV_2$ are filled with the buffer in which the multi membrane electro-decantation is to be performed. Pre-cooled buffer of the required pH is circulated through the buffer sections $S_1$, $S_2$, $S_3$, $S_4$, with the help of gravity feed from a buffer reservoir and a return air lift operated by an aquarium pump. The crude protein mixture contained in reservoir R from which a certain fraction is to be separated is precooled in cooler K and introduced axially into the separation compartments $A_1$, $A_2$, and $A_3$, via inlet tube I. After all three compartments have been filled the supply is cut off and the electric current is switched on. The separation now proceeds at a rate depending on the voltage difference between the carbon electrodes. It was found very useful to have a chromoprotein like hemoglobin or the complex between bilirubin and serum albumin in the crude protein mixture as an indicator to guage the rate of separation. From preliminary tests the time required for separation is determined and utilised as a basis for operation. After this period has elapsed the crude protein mixture is again introduced but now at a slow rate, while the current is passed through the apparatus. The introduced fluid will necessarily have a density lower than that of the layer of protein separated at the bottom of the first compartment $A_1$, but higher than that of the rest of the material in the compartment. It will therefore form a layer between the two phases. The entry of further raw material forces the substance in the top part of $A_3$, over into bottom of $A_2$ and the material in this compartment in turn is forced over into $A_1$. If the rate of introduction is sufficiently slow, separation continues in the introduced fluid in the same way as before. The substance flowing out at the top of $A_1$ passes into a container. If the substance or protein required separates at the bottom of the compartments it can be recovered in a concentrated form by running it out through the tubes 23 at the bottom of the compartments. The reason why a series of separation compartments are employed is to ensure that any substance escaping the first separation is removed in the second and third compartments. It will be advantageous to use a large number of multi-membrane separation compartments in series; this will enable a fairly rapid introduction of crude material into the apparatus.

It will also be advantageous to use wider multi-membrane compartment. In the apparatus shown in Figs. 1 and 2 of the drawings sections of only 1 cm. width were used, as the rectifier available for this operation had an output of only 250 milliampere at 250 volts. This wattage i. e. $0.25 \times 250 = 62.5$ was employed in the present example.

In the preferred form of the apparatus according to this invention, as is shown in Fig. 3, the membranes are obliquely disposed. The apparatus shown in Fig. 3 is substantially the same apparatus as is shown in Fig. 1 but is tilted to the desired angle whereas the electrode vessel $EV_1$ is extended upwardly to prevent overflow of the electrode liquid therefrom and whereby the electrode $C_1$ is fully covered. The membrane strips 20 in the separation compartment $A_1$, $A_2$ and $A_3$ provide acute angles with the direction of migration of the component to be separated.

The buffer solution supplied from reservoir X is cooled by passing it through the cooler K in which refrigerated water is used as a cooling medium. The cooled buffer solution is directed into the buffer compartment $S_1$, $S_2$, $S_3$ and $S_4$ by way of manifold W and passes from such compartment by way of manifold V to the airlift Z which returned it to the reservoir X. The airlift Z receives compressed air at a pressure of about 5 lbs. per square inch whereby a constant circulation of the buffer solution through the system is maintained.

PREVENTION OF HEAT CONVECTION CURRENTS

In order to have a pure or well defined separation of the required or unwanted material whichever the case may be, it is of paramount importance to eliminate all possible heat convection currents which will necessarily produce mixing of components in the separation cells. To avoid this mixing a temperature gradient is established vertically down the separation cells. This can be conveniently and very effectively accomplished as follows:—

The electrodes $C_1$ and $C_2$ are placed in a slanting position in electrode vessels $EV_1$ and $EV_2$ with the top ends closer to each other than the bottom ends. This arrangement of the electrodes is shown in Fig. 3. When the current is passed through the apparatus with the electrodes in the slanting position, stronger current will pass through the top than through the bottom layers of the cells. Consequently, a temperature gradient will be established in the separation cells. This gradient in temperature prevents the occurrence of heat convection currents.

CONCENTRATION OF THE SEPARATED PROTEIN FRACTION

The method provides a convenient means of concentrating the separated protein fraction. This is done by changing the pH of the separated solution to a value where the molecules of the said protein have a mobility in an electric field, and to electro-decant in the multi-membrane cell. The molecules of protein migrate to the membranes and gradually sink to the bottom of the compartment from which the concentrated solution can be separated.

EXAMPLES OF APPLICATIONS OF MULTI-MEMBRANE ELECTRO-DECANTATION (a) Separation of bacterial toxines Bacterial toxines can be purified by multimembrane electro-decantation at their isoelectric points. Such purified toxines are much better antigens in view of the absence of other unwanted culture medium proteins or bacterial by-products. Sera made by using such antigens will be more potent.

(b) Purification of antibodies

As most antibodies are associated with the γ-globulins they will be relativelv easy to separate. This is done by multi-membrane electro-decantation at the isoelectric point, which for γ-globulin is pH 6.6.

(c) Purification of insulin

After extraction of pancreas and inactivitation of the trypsin by alcohol and hydrochloric acid most of the alcohol is removed by evaporation. This concentrated extracts of the insulin can be multi-membrane electro-decanted at the isoelectric point of insulin, which is pH 5.4.

(d) Purification of viruses

Animal viruses are usually obtained only in very crude form in which they are associated with tissue material, such as brain, spleen, chicken embroyo or choric-allantoic membrane. In order to obtain the virus in suspension it is necessary to emulsify this tissue in an appropriate fluid; the virus is thus set free in the medium. To purify (or isolate in a pure form) the virus from such a suspension is very difficult as the virus usually constitutes only a small fraction of the total tissue pulp and very often when the pulp is clarified by centrifuging and filtration the virus is removed from the suspension as well.

It has been found that if such suspension of tissue is electro-decanted in the multi-membrane apparatus, that the unwanted tissue suspension is very rapidly removed from the fluid, leaving a clear virus suspension. The virus is now in solution together with soluble tissue proteins.

To isolate the virus from this latter solution, the solution is again processed through the multi-membrane electro-decantation apparatus.

The virus, which must be in a solution of a pH remote from the isoelectric point of the virus now migrates in the direction of the one or other pole, and is stopped by the membranes, together with other proteins that might be present. The proteins separate at the bottom of the cell and in the process of separation the virus is carried down. The separation of the virus from this concentrated solution is now done by ultra-centrifuging. The final product after ultra-centrifuging is usually contained in a clear pellet.

If the virus is stable at its isoelectric point the separation can be performed differently. This is done by bringing the pH of the medium in which the virus is suspended to the isoelectric point of the virus and multi-membrane electro decantation. At this pH the virus will remain distributed uniformly throughout the medium, and the other protein components or fragments of tissue will migrate to the membranes and be deposited. The virus can then be removed from the medium in a fairly pure state by ultra centrifuging.

Often it happens that the virus is absorbed on to the surface of the membranes after electro-decanting. The fluid can then be removed and replaced by pure buffer. The direction of current is then reversed with the resultant liberation of the virus in the pure buffer. The virus is then recovered by differential centrifuging.

Various types of apparatus may be used in accordance with the present invention. Typical examples are:

(a) Vertical membrane type

In this type of apparatus, see Fig. 1, a plurality of loose membranes in the form of strips separated by loose plastic frames are arranged parallel in a substantially vertical position in the separation compartment. The membranes may be separated e. g. by about 1 mm. from one another. Several such multi-membrane separation compartments may be provided, separated from one another by buffer compartments containing buffer liquid. The said buffer liquid is advantageously cooled and circulated through the said compartments.

The circulation of precooled buffer through compartments interposed between the separation compartments prevents overheating of the material in the separation compartments and also minimises heat convection currents. This cooling allows the use of higher voltage for the separation thereby reducing the separation time.

(b) Oblique membrane type

In this type of apparatus (see Fig. 3) the separation of proteins is facilitated by allowing the protein that migrate to move on to a plurality of membranes positioned obliquely to the vertical and forming an acute angle with the direction of migration of the components to be separated. The advantage of having the membranes arranged obliquely to the direction of migration as described above, is that the proteins that separate onto the membranes slide down on the membranes rather than "fall" back into the cell as would be the case in the apparatus with the membranes positioned vertically. The oblique membrane type of apparatus is ideal for separation of the slowest migrating component in serum, i. e. $\gamma$ globulins.

(c) Continuous separation

In this type of apparatus the main separation is effected in the first multi-membrane separation compartment. Any materials e. g. proteins to be separated that escape the first separation flow over into a second separation compartment where the bulk of the material escaping the first separation is removed. From this compartment it flows over into a third compartment where any traces which still might contaminate the solution are separated. From this final compartment the material flows over into a receiver. The final product is tested for homogeneity by electrophoresis. The purity of the final product is inversely proportional to the rate at which the crude product is introduced into the apparatus.

Having now particularly described and ascertained the nature of my said invention and in what manner the same is to be performed, I declare that what I claim is:

1. Electro-decantation apparatus comprising a plurality of aligned compartments, a plurality of semi-permeable membranes separating each compartment from the adjacent compartments, groups of semi-permeable membranes positioned within alternate compartments, each group having a plurality of spaced parallel membranes, the remaining compartments adapted to contain a buffer, end compartments adapted to receive electrodes, electrodes positioned within said end compartments, pipe means for feeding a protein mixture to the lower part of each of said membrane containing compartments, further pipe means for removing liquid from each of said membrane containing compartments, and means for cooling and decirculating the buffer through said remaining compartments.

2. Electro-decantation apparatus as claimed in claim 1 in which means are provided in said means for feeding protein mixture to said membrane containing compartments for pre-cooling said protein mixture.

3. Electro-decantation apparatus as claimed in claim 1 in which the membranes in said groups of membranes are positioned in said compartments obliquely to the vertical.

4. Electro-decantation apparatus as claimed in claim 1 in which said pipe means for feeding protein mixture to the lower part of each of said membrane containing compartments comprise connecting pipes connecting the top of one of said membrane containing compartments to the lower part of the membrane containing compartment next adjacent thereto in series.

5. Electro-decantation apparatus as claimed in claim 1 in which said electrodes are arranged in said apparatus with the tops of said electrodes closer to each other than the bottoms.

6. A process for the electro-decantation of protein mixtures comprising feeding the protein mixture to an electro-decantation apparatus having a plurality of compartments alternate ones of which are substantially filled with semi-permeable membrane strips, and the remaining ones containing a buffer, the pH of which differs from the iso-electric point of said mixture, circulating the buffer among the remaining compartments, cooling said buffer during circulation, feeding said mixture to the lower part of each of the membrane containing compartments from an adjacent membrane containing compartment in series, and passing a direct current through a solution of the mixture of proteins to be separated and thus causing the protein in the mixture to migrate and become concentrated on the surfaces of the semi-permeable membranes and to sink to the bottom of the membrane containing compartments while the other protein in said mixture remains in solution.

References Cited in the file of this patent

UNITED STATES PATENTS

| 2,251,083 | Theorell | July 29, 1941 |
| 2,331,494 | Murphy | Oct. 12, 1943 |

FOREIGN PATENTS

| 505,752 | Great Britain | May 15, 1939 |
| 505,753 | Great Britain | May 15, 1939 |

OTHER REFERENCES

Langelier: Journal American Water Works Assn., September 1952, pp. 845 to 848.